(12) United States Patent
Nemoto (10) Patent No.: US 6,464,193 B1
(45) Date of Patent: Oct. 15, 2002

(54) SEAT LIFTER WITH RATCHET-TYPE LEVER MECHANISM

(75) Inventor: Akira Nemoto, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 51 days.

(21) Appl. No.: 09/698,196

(22) Filed: Oct. 30, 2000

(51) Int. Cl.⁷ .............................................. F16M 13/00
(52) U.S. Cl. ...................... 248/421; 248/396; 248/422; 297/344.15
(58) Field of Search ................................ 248/422, 421, 248/396, 394, 372.1; 297/344.15, 344.17, 338, 344.12

(56) References Cited

U.S. PATENT DOCUMENTS

| | | | | |
|---|---|---|---|---|
| 4,128,225 A | * | 12/1978 | Kluting et al. | |
| 4,767,156 A | * | 8/1988 | Yamada et al. | |
| 4,787,594 A | * | 11/1988 | Ikegaya et al. | |
| 4,834,333 A | * | 5/1989 | Saito et al. | |
| 5,203,532 A | * | 4/1993 | Matsuura | |
| 5,775,661 A | * | 7/1998 | Matsumoto et al. | |
| 5,882,061 A | * | 3/1999 | Guillouet | |
| 6,290,198 B1 | * | 9/2001 | Kojima et al. | |

FOREIGN PATENT DOCUMENTS

| | | |
|---|---|---|
| JP | 62-36654 Y2 | 9/1987 |
| JP | 63-21457 Y2 | 6/1988 |

* cited by examiner

*Primary Examiner*—Korie Chan
(74) *Attorney, Agent, or Firm*—Browdy and Neimark, P.L.L.C.

(57) ABSTRACT

A seat lifter for height adjustment of vehicle seat, which has a lifter linkage for vertical movement of the seat and a drive mechanism therefor. The lifter linkage includes a pair of links, a bell crank portion formed in one of the two links, and a rotation transmission link element including a sector gear which is operatively connected with the bell crank portion. The drive mechanism comprises a ratchet-type lever mechanism operatively connected via a brake unit with the lifter linkage, the arrangement of which ratchet-type lever mechanism is such that only one-stroke operation of a lever causes a ratchet pawl member to rotate so as to bring a selected one of its two toothed ratchet pawls to meshed engagement with a mating one of two ratchet gear wheels, thereby allowing for automatically selecting a desired operative direction without any switch-over operation and then continuously transmitting a certain amount of rotation force to the lifter linkage, so that the vehicle seat can easily be raised or lowered to a certain level.

10 Claims, 4 Drawing Sheets

SEAT LIFTER WITH RATCHET-TYPE LEVER MECHANISM

BACKGROUND OF INVENTION

1. Field of the Invention

The present invention relates to a seat lifter (or seat height adjuster) for adjustment in height of an automotive seat and a lever drive mechanism provided in the seat lifter, which is driven by an operation lever for actuation of the seat lifter for the height adjustment of seat. Particularly, the invention is directed to a seat lifter having forward and rearward links movable interlockingly for adjustment in height of the seat and also to a ratchet-type lever mechanism adaptable for use in the seat lifter to cause such interlocking movement of those two links.

2. Description of Prior Art

A seat height adjuster or what is known as a seat lifter is incorporated in automotive seat to enable an occupant on the seat to selectively adjust the height of seat according to his or her physique and seating posture. In the seat lifter, typically known is a linkage-type seat lifter having forward and rearward links which are interlockingly movable and pivotally coupled with the forward and rearward portions of the seat, respectively, so that the seat may be raised and lowered via those two links. This seat lifter includes plural transmission gears (reduction gears and the like), a brake unit, and a drive mechanism provided with a lever or handle, wherein the drive mechanism is operatively connected through the transmission gears and bake unit to the forward and rearward links. Thus, the drive mechanism is operable by a user who handles its lever to cause both of the two links to move in synchronized way, thereby selectively raising and lowering the seat to a desired point of level.

In this construction of seat lifter, a load is directly transmitted to the drive mechanism via the foregoing constituent elements, and therefore, a much force is required on the user's part to operate the lever or handle. This poses an unfavorable bar to a smooth and easy operation.

Conventionally, to avoid such defective aspect, a ratchet-type lever mechanism has been employed, which utilizes a known ratchet gear comprising a ratchet gear and ratchet pawl so as to limit the rotation of a lever to one operative direction. With this mechanism, one can simply rotate an operation lever repeatedly in vertical direction, with a small force, due to the combination of ratchet and lever, so that a rotational force is smoothly transmitted to the seat lifter for adjustable vertical movement of the seat to a desired level.

In ordinary, such known ratchet-type lever mechanism requires switching over the direction of rotation of the ratchet gears through operation of secondary associated lever or button. This secondary lever or button is normally disposed adjacent to the main operation lever of the lever mechanism. In most instances, however, the main operation lever of this kind is situated in a narrow space between the lateral side of seat cushion and the door or wall of automobile, which results in a user having to grope for that secondary lever or button to switch over the ratchet gears. Most possibly, this will be a issue of poor usability of the mechanism in that it frequently forces a user to feel for the secondary lever without ascertaining it with his or her own eyes, with the result that the user will erroneously switch over the secondary lever to a wrong operative position. It is therefore of a high likelihood that the user has not noticed this error until he or she handles the main operation lever and then needs to again switch over the secondary lever to a right operative position, which raises a troublesome aspect or a poor usability as well. Further, the provision of such secondary switch-over lever or button leads inevitably to a complicated structure of the ratchet-type lever mechanism on the whole.

Also, with regard to the conventional structure of seat lifter itself, the forward and rearward links thereof are connected, via transmission gears (reduction gears), to the ratchet-type lever mechanism. The gears are prone to wabbling or rattling due to clearances among the gears, and there is the likelihood that the stability or seating touch of seat will be degraded.

SUMMARY OF THE INVENTION

In view of the above-stated drawbacks, it is a primary purpose of the present invention to provide an improved seat lifter with ratchet-type lever mechanism which is easy to operate and simplified in structure.

In order to achieve such purpose, the seat lifter of this kind in accordance with the present invention is basically comprised of:

a linkage means for operative connection with the vehicle seat, the linkage means including a first link means and a second link means, each being to be pivotally connected with forward and rearward sides of the vehicle seat, respectively, such as to allow rotative vertical motion of the linkage means, wherein one of said first and second link means is formed with a bell crank portion in an integral manner;

a drive means operatively connected with the linkage means;

the linkage means including a rotation transmission link means operatively connected between those linkage and drive means such that an operative rotation force applied from the drive means is transformed into the rotative vertical motion of the linkage means;

a brake means for providing a braking action to the rotative vertical motion of linkage means;

the rotation transmission link means including a sector gear means which is in a meshed engagement with the brake means; and the drive means comprising a ratchet-type lever mechanism which includes:

a support base means;

a ratchet gear wheel means having a bearing shaft as the center of rotation thereof, the bearing shaft being rotatably supported by said support base means and securely connected with the brake means;

the ratchet gear wheel means including at least a first ratchet gear wheel and a second ratchet gear wheel, wherein each of the first and second ratchet gear wheel has one-way clutch means built therein, with such an arrangement that the first ratchet gear wheel is to be locked to the shaft in a normal direction for integral rotation therewith, while being allowed to rotate about the shaft in a reverse direction, and that the second ratchet gear wheel is to be locked to the shaft in the reverse direction, while being allowed to rotate about said shaft in the normal direction; and a ratchet pawl means rotatably supported by the support base means, the ratchet pawl means including a pair of first and second toothed ratchet pawls which are disposed thereon in correspondence with the respective first and second ratchet gear wheels and further spaced apart from each other by a central angle relative to the center of rotation associated with the shaft of the ratchet gear wheel means; a lever means operatively connected with the ratchet pawl means;

wherein operation of the lever means causes selective rotation of the ratchet pawl means in a selected one of the normal and reverse directions from a neutral position where the ratchet pawl means is normally out of meshed engagement with the ratchet gear wheel means, so that a selected one of the first and second toothed ratchet pawls is rotated in the selected one of normal and reverse directions and brought to meshed engagement with a mating one of the first and second ratchet gear wheels;

and a biasing means for normally biasing the ratchet pawl means in a direction to the neutral position, thereby normally placing both first and second toothed ratchet pawls in a point out of engagement with the first and second ratchet wheels.

Accordingly, by initially rotating the lever means in a selected one of tow directions, a selected one of the first and second toothed ratchet pawls is brought to meshed engagement with a mating one of the first and second ratchet gear wheels, so that a user can readily select a desired corresponding direction for operation of the drive means of ratchet-type lever mechanism, without any switch-over operation, and then, by continuing to rotate the lever means, the linkage is moved in a selected one of upward and downward directions, thereby allowing the user to adjust the height of seat. Further, the seat lifter per se is Simplified in structure since the linkage means may be basically formed only by the first and second link means and the rotation transmission link means without requiring no other transmission gear mechanism, so that the seat lifter can be easily assembled with a less amount of parts and fittings required.

Another various advantages and features of the present invention will become apparent from reading of the descriptions hereinafter, with reference to the annexed drawings.

DETAILED DESCRIPTION OF PREFERRED EMBODIMENTS OF THE INVENTION

Referring to FIGS. 1 through 7, there is, by way of example, illustrated one best mode of seat lifter, as generally designated by (1), for use in an automotive seat (S) in accordance with the present invention. The seat lifter (1) includes a lifter linkage (10) as a basic means for causing vertical movement of the seat (S). In accordance with the present invention, a novel ratchet-type drive mechanism (18) is provided for operative connection with the linkage (10).

Figure 1:
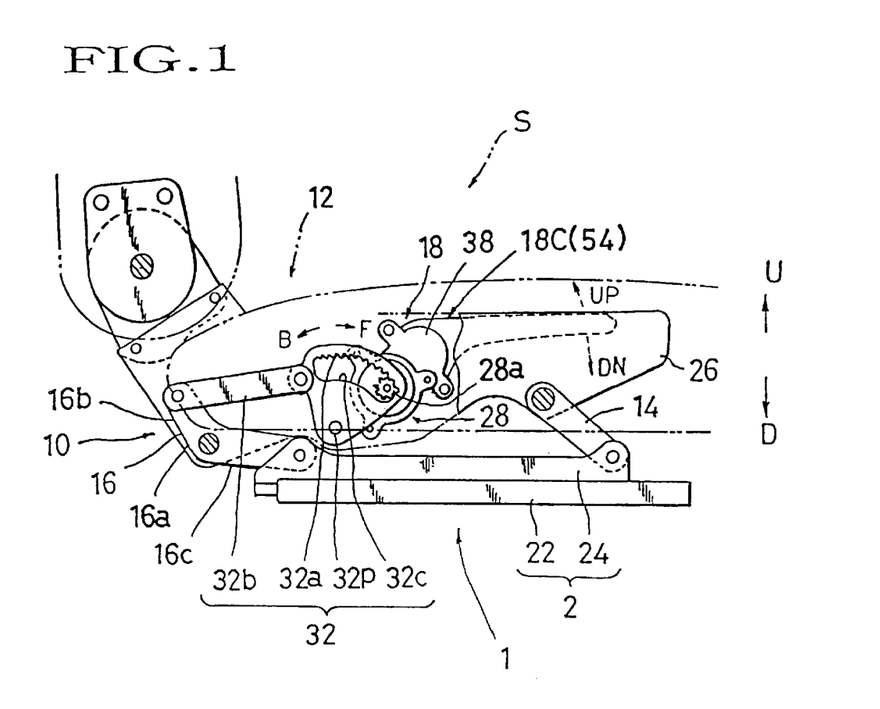
FIG. 1 is a partly broken schematic side view showing the state where a seat lifter of the present invention is provided in a vehicle seat, wherein one mode of linkage is employed.
Figure 2:
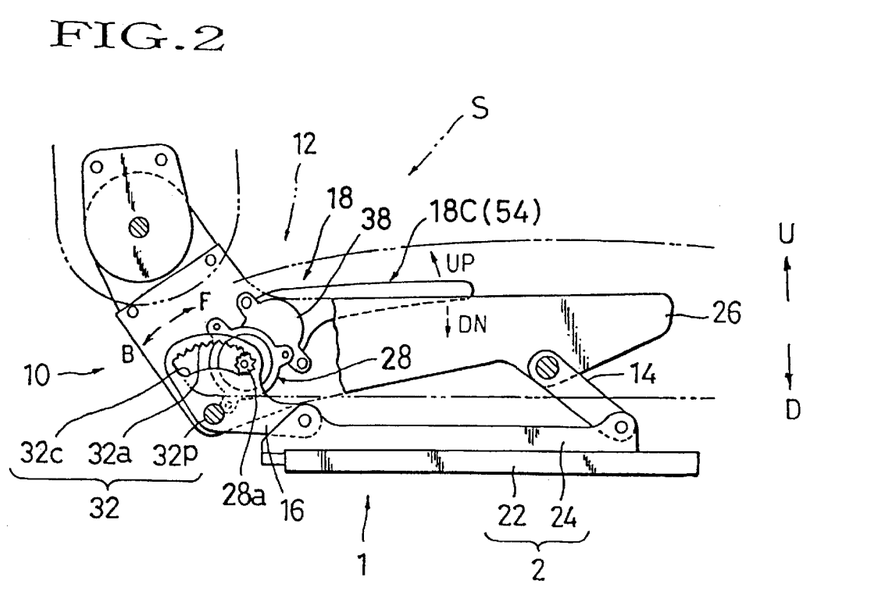
FIG. 2 is a partly broken schematic side view showing the state where the seat lifter is provided in the vehicle seat, wherein another mode of linkage is employed.

As shown in FIGS. 1 and 2, the seat lifter (1) may be provided between a seat cushion (12) of the seat (S) and a slide rail device (2) fixed on a floor of automobile (not shown), wherein the slide rail device (2) is a conventional one typically comprising an upper movable rail (24) and a lower stationary rail (22). Generally stated now, in accordance with the present invention, the linkage (10) basically may comprise a forward link (14) of rectilinear shape, a rearward link (16) of generally "L" shape, and a rotation transmission link means (generally designated by (32)). The ratchet-type drive mechanism (18) is operatively coupled with those two links (14) (16) via the rotation transmission link means (32) to be elaborated later. The forward and rearward links (14) (16) are so pivotally arranged as to support the forward and rearward sides of the seat (S), respectively, in a vertically movable manner relative to the slide rail device (2). As is known, a brake unit (28) is connected between the drive mechanism (18) and rotation transmission link means (32), providing a braking action on the drive mechanism (18) and thus acting to normally lock both links (14) (16) to a given position. This brake unit (28) has an output pinion gear (28a) which is meshed with the sector gear (32a), a part of the rotation transmission link means (32).

In both modes of FIGS. 1 and 2, while a detailed description will be made thereon later, the common basic formation of linkage (10) may be such that the forward link (14) thereof is pivotally connected at its upper end to the forward end portion of seat cushion frame (26) and also likewise connected at its lower end to the forward end portion of lower rail (24), whereas on the other hand, the rearward "L" shaped link (16) thereof has a central point (16a) pivoted on the rearward end portion of seat cushion frame (26), with a pair of upper and lower link halves (16b) (16c) defined on the opposite sides of that central point (16a). The lower link half (16c) of this rearward link (16) is pivotally connected with the rearward end portion of upper rail (24), while by contrast, the upper link half (16b) thereof assumes a bell crank portion in the rotation transmission link means (32) for operative connection with the drive mechanism (18) via the brake unit (28).

Figure 3:
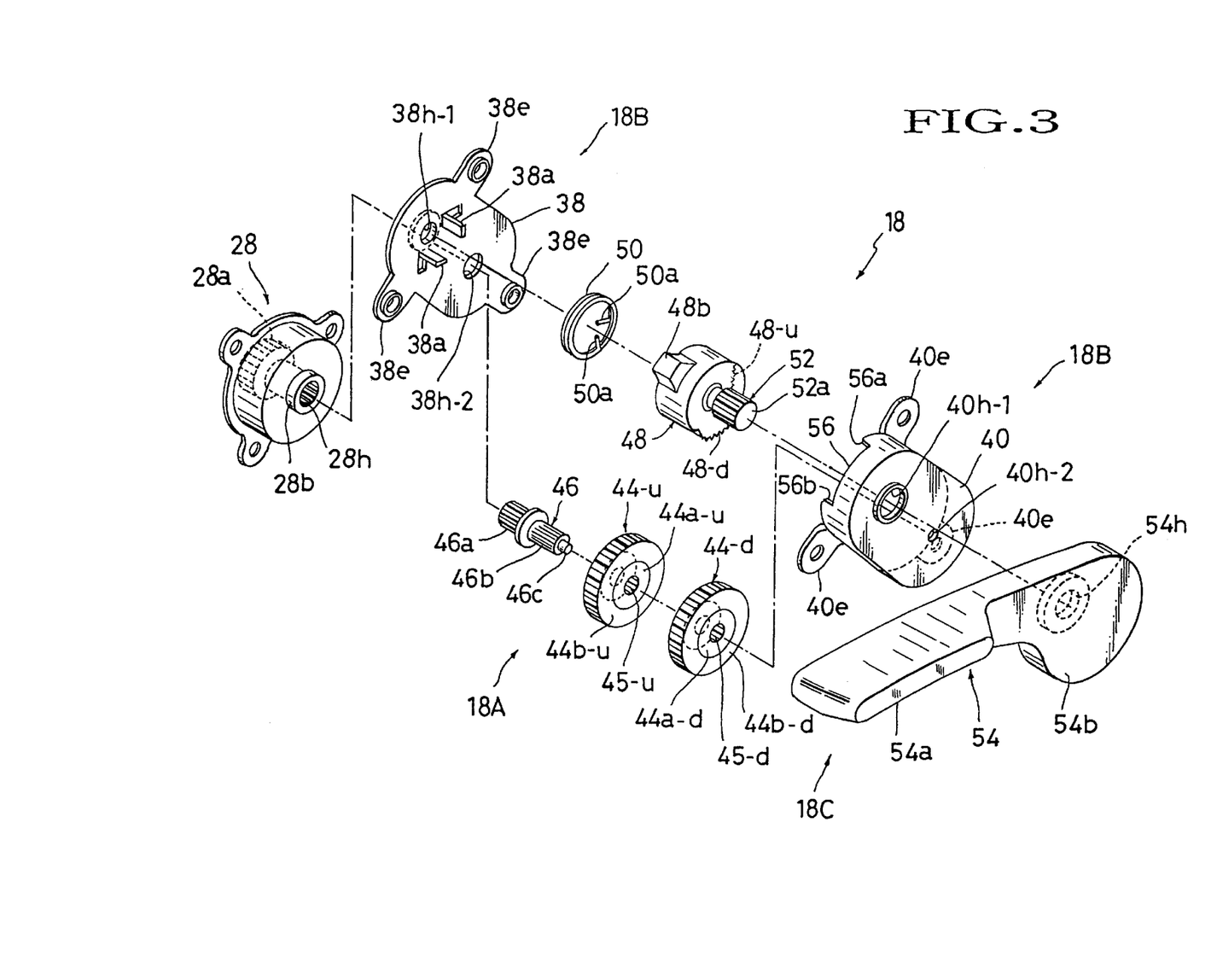
FIG. 3 is an exploded schematic perspective view of a ratchet-type lever mechanism provided in the seat lifter in accordance with the present invention.

In accordance with the present invention, a preferred mode of the drive mechanism (18) is best shown in the exploded perspective in FIG. 3, which presents a novel lever-operable ratchet gear arrangement workable with the afore-stated linkage (10). Within the gist and scopes of the present invention, the drive mechanism (18) per se is of a ratchet-gear type including a novel ratchet gear mechanism, designated generally by (18A), which allows for transmitting a rotary operation force in a selected direction to the linkage (10) by one stroke of rotation of a lever means (18C). The drive mechanism (18) also includes a support base unit (18B) to support the ratchet gear mechanism (18A).

Specifically, as understandable from the illustrated embodiment of FIG. 3, the support base unit (18B) is comprised of outer and inner support members (40) (38) which are so secured together as to accommodate therein the ratchet gear mechanism (18A) which will be elaborated later. The inner support member (38) is formed with a first bearing hole (38h-1) and a second bearing hole (38h-2) therein and has three coplanar securing portions (38e) projected outwardly thereof. On the other hand, likewise, the outer support member (40) is formed with first and second bearing holes (40h-1) (40h-2) which are respectively in a coaxial relation with the first and second bearing holes (38h-1) (38h-2) of the counterpart (38), and further has three coplanar securing portions (40e) which project outwardly in correspondence with the respective three securing portions (38e) of the same counterpart (38). Further, the outer support member (40) has an arcuate cut-out region (56) defined in one vertical peripheral lateral wall thereof, wherein the arcuate cut-out region (56) has a pair of first and second edges (56a) (56b) which serve as a means for restricting the rotation range of the ratchet gear mechanism (18A) as will be explained.

The lever means (18C) is embodied by the illustrated configuration of operation lever (54) having a base section (54b) and a handle section (54a). The base section (54b) is formed with a serrated connecting hole (54h).

Turning back to the inner support member (38), it also has a pair of spaced-apart projected lugs (38a) (38a), against which are respectively abutted the a pair of spaced-apart end portions (50a) (50a) of circular return spring (50) adapted for biasingly causing the operation lever (54) to return to a neutral position each time the lever is rotated and released. Such two end portions (50a) of circular return spring (50) are bent towards each other in a direction diametrically of the circular spring (50). The two lugs (38a) are formed by punching out and upturning the corresponding two areas perpendicularly from one planar wall side of the inner support member (38) that faces towards the outer support member (40). Those two lugs (38a) are also spaced apart from each other at a predetermined distance along the circumference of a circle having its center at the center of first bearing hole (38h-1).

Figure 4:
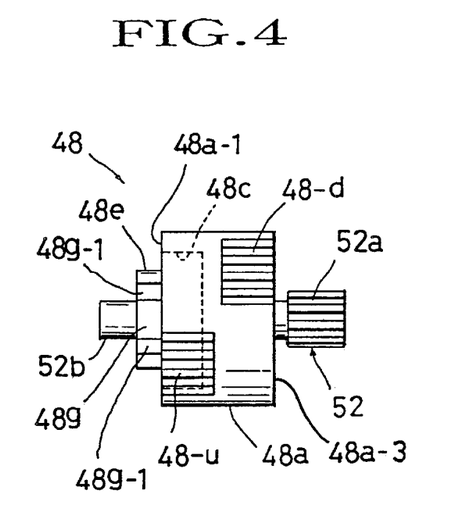
FIG. 4 is a side view of a ratchet pawl member employed in the ratchet-type lever mechanism as viewed from its first and second toothed ratchet pawls.
Figure 5:
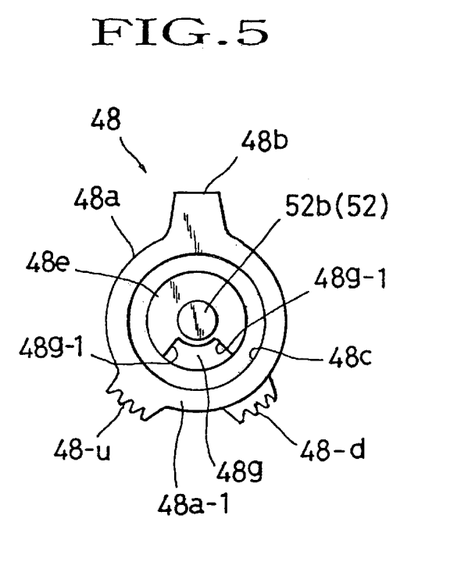
FIG. 5 is a plane view of the ratchet pawl member as viewed from its auxiliary columnar portion.

According to the illustrated embodiment, the ratchet gear mechanism (18A), in brief, is comprised of a ratchet pawl member (48) and a pair of first and second ratchet gear wheels (44-u) (44-d) each having a one-way clutch (not shown) built therein, all of which are arranged for interlocking with the operation lever (54). Specifically, as seen from FIGS. 3 to 5, the ratchet pawl member (48) has a main columnar body (48a) with a shaft (52) fixed integrally therewith as a central axis thereof. One end of the shaft (52) is integrally formed with a serrated portion (52a). Formed integrally with the main columnar body (48a) are a pair of first and second toothed ratchet pawls (48-u) (48-d) which are disposed on the circumferential side wall of the body (48a) in an offset fashion with respect thereto, such that the two pawls (48-u) (48-d) project outwardly therefrom in a radial direction and are distant from each other by a certain central angle with respect to the shaft (52). The ratchet pawl member (48) further has an auxiliary columnar portion (48b) formed on and about another end portion (52b) of the shaft (52). As shown in FIGS. 4 and 5, the auxiliary columnar portion (48e) is of a smaller diameter than that of the main columnar body (48a) and adjoined integrally to one planar wall (48a-1) of the same body (48a) which is opposite to another planar wall (48a-3) thereof where that serrated portion (52a) lies. In that auxiliary columnar portion (48e), there is defined a sector recession (48g) which is formed by cutting out a predetermined part of the auxiliary columnar portion (48e) in a sector fashion relative to the shaft (52). The sector recession (48g) is so configured that both two ends (50a) of circular return spring (50) are engaged and retained therein.

An annular groove (48c) is shown as being formed circumferentially of the auxiliary columnar portion (48e) in the vertical planar wall (48a-1) of the main columnar body (48a). This annular groove (48c) is adapted for allowing the afore-stated two projected lugs (38a) to be movably inserted or accommodated therein.

Designation (48b) denotes a projected stopper portion integrally formed on the circumferential side wall of the main columnar body (48a) in a diametrically opposed relation with the sector recession (48g) and two toothed ratchet pawls (48-u) (48-d). The projected stopper portion (48b) itself serves as a means for restricting the rotation of the present ratchet member (48) in conjunction with the above-stated arcuate cut-out region (56).

As best seen in FIG. 3, the first and second ratchet gear wheels (44-u) (44-d), forming a part of the drive mechanism (18), are each fixed on a bearing shaft (46) via a one-way clutch mechanism (not shown). In other words, each ratchet gear wheel is of the type having one-way clutch mechanism built therein. Since the one-way clutch mechanism itself is well known in the art and widely available on the market, any detailed explanation thereon is omitted. In brief, the first ratchet gear wheel (44-u) has an inner wheel portion (44a-u) incorporating a one-way clutch mechanism (not shown) therein and an outer gear wheel portion (44b-u) operatively engaged about the inner wheel portion (44a-u), with such an operative arrangement that both two wheel portions (44a-u) (44b-u) will be rotated together in a normal direction, due to the outer gear wheel portion (44b-u) being locked to the inner wheel portion (44a-u), and that, in a reverse direction opposite to the normal direction, the outer gear wheel portion (44b-u) is allowed to rotate freely about the inner wheel portion (44a-u). Likewise, the second ratchet gear wheel (44-d) has an inner wheel portion (44a-d) incorporating a one-way clutch mechanism therein and an outer gear wheel portion (44b-d) operatively engaged about that inner wheel portion (44a-d). The operative arrangement of this second ratchet gear wheel (44-d) is similar to that of the first one (44-u) as described above, only except that the direction of rotation thereof is opposite to that of the latter, as will be explained later.

As understandable from FIG. 3, the outer and inner support members (40) (38) are secured together by securing their respective securing legs together via bolts and nuts (not shown), with the ratchet pawl member (48) and two ratchet gear wheels (44-u) (44-d) being accommodated therein. Specifically stated, the ratchet pawl member (48) is rotatably journalled between the outer and inner support members (40) (38) such that one shaft end (52b) thereof is rotatably supported in the first bearing hole (38h-1) of inner support member (38), while another serrated shaft end portion (52a) thereof rotatably passes through the first bearing hole (40h-1) of outer support member (40). In this respect, as can be seen from FIGS. 6 to 8, both two lugs (38a) projected from the inner support member (38) are so located in the annular groove (48c) of ratchet pawl member (48) as to avoid interference with rotation of the ratchet pawl member (48) about its shaft (52). The serrated end portion (52a) of the ratchet pawl member (48) is firmly meshed in the serrated connecting hole (54h) of operation lever (54), thereby establishing an interlocking connection between the ratchet pawl member (48) and the lever (54) It is noted here that the projected stopper portion (48b) of ratchet pawl member (48) is movably disposed within the arcuate cut-out region (56) of outer support member (40), and that the circular return spring (50) is wound around the auxiliary columnar portion (48b) of ratchet pawl member (48) (see FIG. 6). In this respect, as in FIG. 6, both two end portions (50a) of the return spring (50) are not only resiliently retained in the sector recession (48g) formed in the auxiliary columnar portion (48b), but also are held between the two projected lugs (38a) against rotational movement relative to the ratchet pawl member (48).

Figure 6:
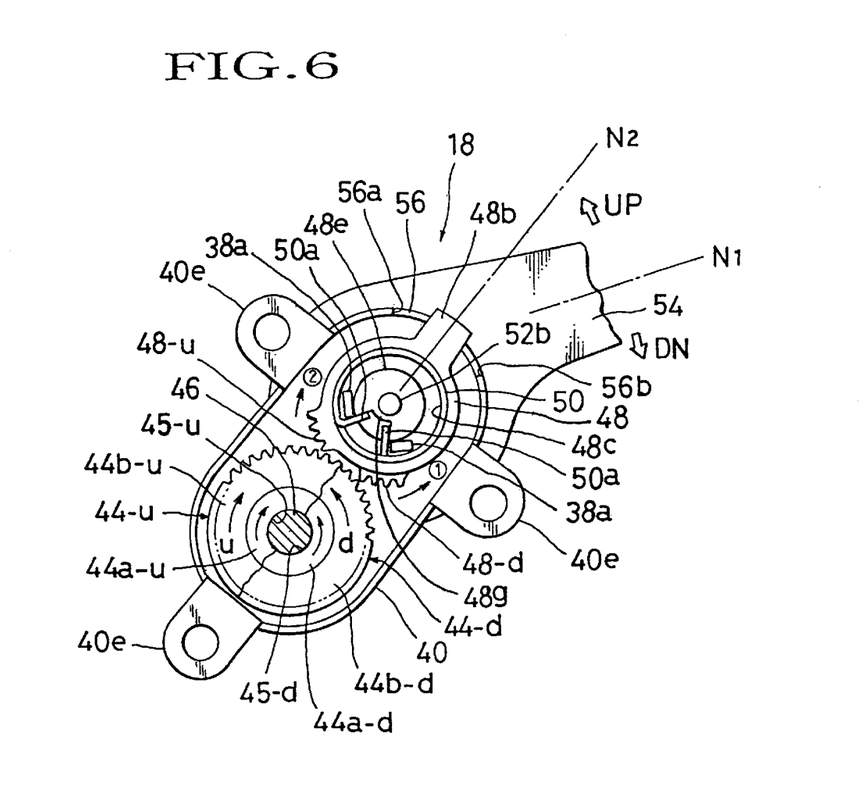
FIG. 6 is a partly broken front view of the ratchet-type lever mechanism as viewed from the inner side thereof with which a brake unit is connected, showing a basic principle of motions of the mechanism.

In other words, such two spring end portions (50a) are resiliently abutted against the respective two lateral walls (48g-1) of the sector recession (48g), thereby normally biasing the ratchet pawl member (48) to a neutral position (N2) where the projected stopper portion (48b) is positioned at a central point in the arcuate cut-out region (56) and both two toothed ratchet pawls (48-u) (48-d) are out of engagement with the respective two ratchet gear wheels (44-u) (44-d).

Owing to this biasing effect, the operation lever (54) is resiliently retained at a neutral non-use position which is indicated by (N1) in FIG. 6. To precisely achieve such biasing action of return spring (54), it is preferred that the two projected lugs (38a) be spaced form each other such that their respective inward edges are each situated on a line which extends along each of the two lateral walls (48g-1) of sector recession (48g) from the central axis (at 52b) as can be seen from FIG. 6.

With regard to the first and second ratchet gear wheels (44-u) (44-d), these are rotatably journalled via a shaft (46) between the inner and outer support members (38) (40). The shaft (46) is so formed to have a serrated end portion (46a), a bearing shaft body (46b) and a connecting end portion (46c) defined therein. Specifically, the two ratchet gear wheels (44-u) (44-d) are, at their respective holes (45-u) (45-d), fixedly attached about the bearing shaft body (46b) of shaft (46), and the serrated end portion (46a) of the same shaft (46) is rotatably received in the second hole (38h-2) of inner support member (38) and firmly meshed in the serrated connecting hole (28h) of a brake unit (28). On the other hand, the connecting end portion (46c) of shaft (46) is rotatably received in the second bearing hole (40h-2) of outer support member (40). Thus, it is seen that both two ratchet gear wheels (44-u) (44-d) are connected coaxially with the output pinion gear (28a) of brake unit (28).

As seen from FIG. 6, it is important that both shafts (52) and (46) associated respectively with the ratchet pawl member (48) and two ratchet gear wheels (44-u) (44-d) should be located on a rectilinear line indicative of the neutral position (N2) and also be located relative to each other to the extent that the two toothed ratchet portions (48-u) (48-d) are normally positioned adjacent to and disengaged from the respective two ratchet gear wheels (44-u) (44-d) so that they may be immediately brought to meshed engagement with a selected one of them. Of course, for that purpose, both two first bearing holes (38h-1) (40h-1) should be properly arranged apart from the two second bearing holes (38h-2) (40h-2), respectively.

With regard to the two projected lugs (38a) again, the positions of them are a point for bringing a selected one of the two toothed ratchet pawls (48-u) (48-d) to and out of mesh with the respective two gear wheels (44-u) (44-d) in conjunction with the return spring (50). For this reason, with reference to FIG. 6, it is essential to preset the location of a central line between the two lugs (38a) in conformity with the neutral line (N2) in the inner support member (38) with respect to the neutral non-use position (N1) of operation lever (54), wherein the neutral line (N2) is a rectilinear line extending through both two centers of rotation (at 52band 46) respectively of the ratchet pawl member (48) and ratchet gear wheels (44-u) (44-d), upon which line (N2), the central lines of projected stopper portion (48b) and sector recession (48g) are positioned, thus placing the two toothed ratchet pawls (48-u) (48d) in a point just symmetric relative to that particular line (N2) to provide a complete unlocking point where those two pawls are kept out of mesh with the respective two ratchet gear wheels (44-u) (44-d).

Referring now to FIG. 1 in conjunction with FIG. 3, it is observed that the output pinion gear (28a) of brake unit (28) is operatively connected with the rotation transmission link means (32) associated with the linkage (10) for interlocking connection with both forward and rearward links (14) (16). As seen from FIG. 1, the rotation transmission link means (32) may comprise a sector gear (32a), an arcuate guide portion (32c) and a connecting link (32b). The sector gear (32a) is rotatably supported, at its lower end, on a pin (32P) fixed to the seat cushion frame (26), the pin (32P) being a center of rotation for the gear (32a). Both sector gear (32a) and arcuate guide portion (32c) are formed together into an integral sector gear having an arcuate slit defined therein. As understandable from FIG. 1, the pinion gear (28a) of brake unit (28) is disposed in such arcuate slit, such that the upper gear region thereof is meshed with the sector gear (32a), while the lower gear region thereof is slidably contacted with the arcuate guide portion (32c). One side of this sector gear unit is pivotally connected with one end of the connecting link (32b). Another end of that connecting link (32b) is in turn pivotally connected with upper half (16b) of rearward link (16). With this arrangement, a rotation output from the brake unit (28) or the drive mechanism (18) can be directly and completely transmitted to the linkage (14, 16) without wobbling and insufficient engagement between the pinion and sector gears (28a) (32a). This means that there is no need to provide any reduction gear mechanism and complicated transmission mechanism in the present lifter (1), and thus, any wobbling or rattling problem is avoided, which is inherent in those mechanisms due to a gear clearance or the like, so that a stable seating touch is attained on the seat (S).

Alternatively, as suggested in FIG. 2, the rotation transmission link means (32) may be embodied by forming together the sector gear (32a), arcuate guide portion (32c) and one end of rearward link (16) into an integral unit without the connecting link (32b) of the foregoing mode shown in FIG. 1.

Now, operation of the above-constructed lifter (1) will be described, with reference to FIGS. 6 to 8.

FIG. 6 generally shows a basic operative motion of the ratchet mechanism (18) described above for ready understanding thereof. As seen from this FIG. 6, the operation lever (54), when in no use, is set to the neutral non-use position (N1) under the biasing force of return spring (10), while the ratchet pawl member (48) is thereby biasingly held at a given home position, i.e a neutral position (N2) out of mesh with both two ratchet gear wheels (44-u) (44-d). In brief, upward rotation of the lever (54) in the arrow (UP) from the neutral position (N1) causes simultaneous rotation of the ratchet pawl member (48) about the central axis (at the shaft 52) in the anticlockwise direction ①, thereby bringing the first toothed ratchet pawl (48-*u*) to meshed engagement with the first ratchet gear wheel (44-*u*). Then, continuing on to rotate the lever (54) upwardly causes clockwise rotation of the first ratchet gear wheel (44-*u*) as indicated by the arrow (u). Namely, both inner and outer wheel portions (44*a*-*u*) (44*b*-*u*) associated with that first wheel (44-*u*) are rotated in the clockwise direction, causing simultaneous rotation of the bearing shaft (46), by the reason that the previously stated one-way clutch mechanism locks those two wheel portions together with respect to that shaft (46). Then, the brake unit shaft (28*b*), firmly connected with the shaft (46), is rotated clockwise, which in turn causes simultaneous rotation of the pinion gear (28*a*) of brake unit (28) in the same clockwise direction, whereby, referring to FIG. 1, the rotation transmission means (32) or sector gear (32*a*) meshed with the pinion gear (28*a*) is caused to rotate about a pin (32P) in the forward arrow direction (F), as a result of which, the linkage (10) (i.e. both forward and rearward links (14) (16)) is simultaneously raised, to thereby lift the seat (S) upwards as indicated by the arrow (U) to a given level.

Conversely, when the lever (54) is rotated downwards in the arrow direction (DN) from the neutral position (N1), then the ratchet pawl member (48) is rotated clockwise as indicated by the arrow ②, thereby bringing the second toothed ratchet pawl (48-*d*) to meshed engagement with the second ratchet gear wheel (44-*d*). Thus, continuing on to rotate the lever (54) downwardly causes anticlockwise rotation of the second ratchet gear wheel (44-*d*) as indicated by the arrow "d". In other words, both inner and outer wheel portions (44*a*-*d*) (44*b*-*d*) associated with that second wheel (44-*d*) are rotated in the clockwise direction, causing simultaneous rotation of the bearing shaft (46), by the reason of the previously stated one-way clutch mechanism locking those two wheels with respect to that shaft (46). This rotation causes simultaneous rotation of the pinion gear (28*a*) of brake unit (28) in the same anticlockwise direction, whereby, referring to FIG. 1, the rotation transmission means (32) or sector gear (32*a*) meshed with the pinion gear (28*a*) is caused to rotate about a pin (32P) in the backward arrow direction (B), with the result that the linkage (10) is simultaneously moved downwards, to thereby lower the seat (S) as indicated by the arrow (D) to a given level.

It is therefore appreciated that, by initially rotating the lever (54) a small amount in a selected one of the upward and downward directions, a user can readily and automatically select a desired corresponding direction for operation of the drive mechanism (18) without any switch-over operation, and then, by continuing to rotate the lever (54), the linkage (10) is moved in the selected corresponding direction (U or P as in FIG. 1), thereby allowing the user to adjust the height of seat (S) at his or her preferred level.

The foregoing basic principle of operation are also applied to the second linkage mode of FIG. 2 in exactly the same way, and the detailed explanation thereabout is omitted for the sake of simplicity.

Hereinafter, referring to FIGS. 7 and 8, a more specific description will be made of operation and motions of the lifter (1), assuming that it is operated to raise the seat (S).

Figure 7:
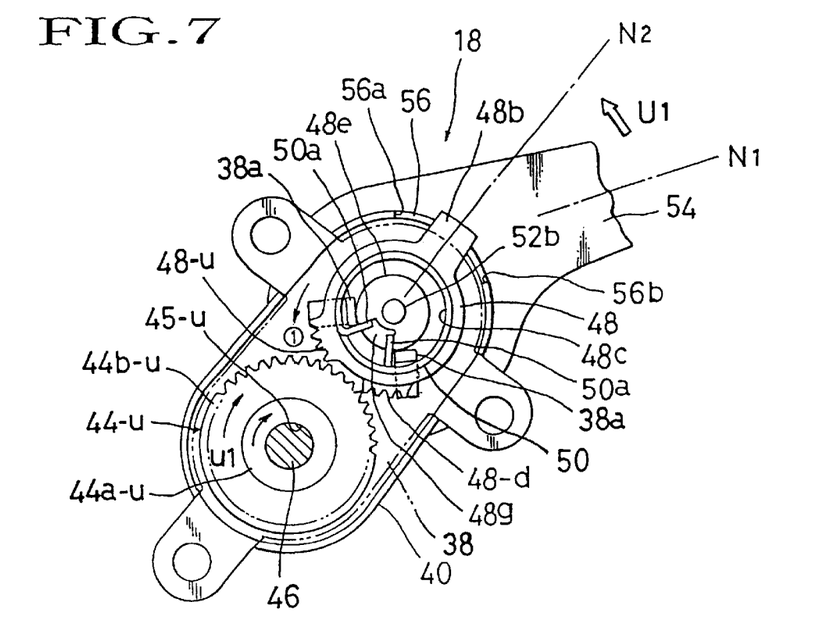
FIG. 7 is a partly broken front view of the ratchet-type lever mechanism similar to the FIG. 6, which explanatorily shows initial relative motions among the operation lever, ratchet pawl member and ratchet gear wheels.

At first, the operation lever (54) is shown in FIG. 7 as being normally set at the neutral non-use position (N1) under the biasing force of return spring (50). Owing to this biasing, the ratchet pawl member (48) is also normally set to a neural position where its first and second toothed ratchet pawls (48-*u*) (48-*d*) are disposed symmetrically relative to the above-mentioned neutral line (N2) and thus are both kept out of engagement with the respective two ratchet gear wheels (44-*u*) (44-*d*).

As shown in FIG. 7, a user who wishes to raise the seat (S) can initially rotate the lever (54) in the upward arrow direction (U1), overcoming the biasing force of return spring (50), to cause anticlockwise rotation of the ratchet pawl member (48) as indicated by the arrow ①, thereby bringing the first ratchet pawl (48-*u*) to meshed engagement with the first ratchet gear wheel (44-*u*) and setting the drive mechanism (18) to an upward operative position. At this moment, the user can notice that the drive mechanism (18) is ready for upward operation. Then, when the lever (54) is rotated in the upward direction, the first ratchet pawl (48-*u*) is rotated anticlockwise, while on the contrary, the first ratchet gear wheel (44-*u*) is caused to rotate clockwise as indicated by the arrow (u1) owing to the above-discussed locking action of one-way clutch mechanism. This causes rotation of the shaft (28*b*) of brake unit (28) in the same clockwise direction, which results in simultaneous clockwise rotation of brake unit pinion gear (28*a*), whereupon, referring to FIG. 1 or 2, the sector gear (32*a*) meshed with that pinion gear (28*a*) is rotated in the forward direction (F), thereby rotatively displacing the whole rotation transmission link means (32) (i.e. 32*a*, 32*b* and 32*c* as in FIG. 1; or 32*a* and 32*c* as in FIG. 2) in the forward direction of the seat (S). Such series of rotative actions finally cause both forward and rearward links (14) (16) to move upwards to raise the seat (S) in the upward direction (U).

Figure 8:
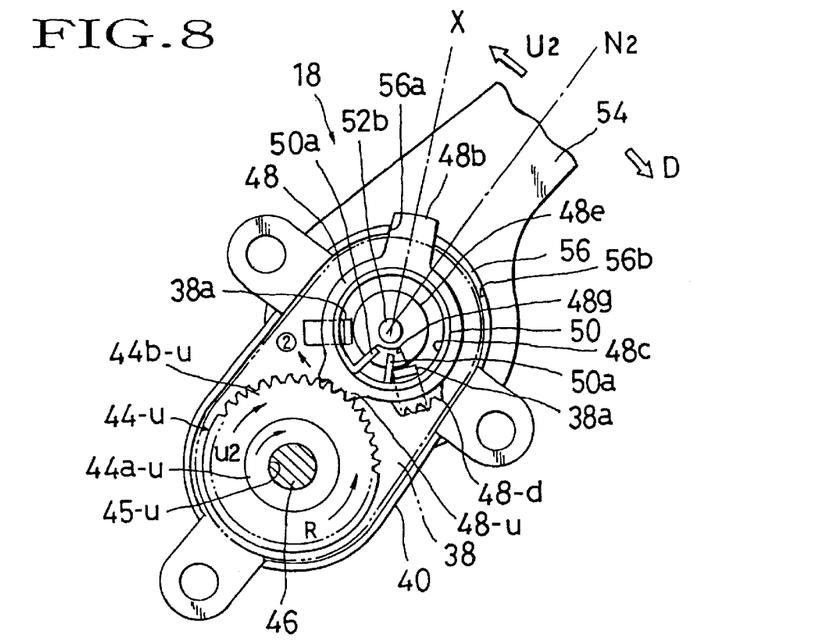
FIG. 8 is a partly broken front view of the ratchet-type lever mechanism similar to the FIG. 6, which explanatorily shows the state where further rotation of the operation lever brings the ratchet pawl member to selective meshed engagement with one of two ratchet gear wheels.

While continuing on to rotate the lever (54) still further as indicated by the arrow (U2) in FIG. 8, the user notices its limit of upward rotation, due to the fact that the projected stopper portion (48*b*) is rotated and contacted with the first edge (56*a*) of arcuate cut-out region (56), which prevents the lever (54) against further upward rotation. Here, it is observed in FIG. 8 that the ratchet pawl member (48) has been rotatively displaced to an upward limit (X) relative to the rotation center (at 52*b*), which indicates the completion of one stroke of its upward rotation to attain a certain raised level of the seat (S). At the same time, the return spring (50) is wound further together with such rotation of ratchet pawl member (48) and resiliently contracted about the auxiliary columnar portion (48*e*) from one end (50*a*) thereof, as shown in FIG. 8, thereby reserving an amplified biasing force therein. If the user finds such one stroke to attain a desired height of the seat (S), he or she may release the lever (54) to allow the lever itself to be returned by the amplified biasing force of return spring (50) in the arrow direction (D) to the neutral position (N1). In that case, such biasing force attempts to rotate the ratchet pawl member (48) in the clockwise direction ②. Responsive thereto, the one-way clutch mechanism allows the outer gear wheel (44*b*-*u*) to rotate about the inner wheel portion (44*a*-*u*) anticlockwise (i.e. in the arrow direction (R)), while that inner wheel portion (44*a*-*u*) is left locked to the shaft (46). Hence, the first ratchet gear wheel (44-*u*) per se is immediately rotated back in the anticlockwise direction (R) towards the neutral position (N2), causing clockwise rotation of the first ratchet pawl (48-*u*) as indicated by the arrow ②. As a result, the first ratchet pawl (48-*u*) is released from engagement with the first ratchet gear wheel (44-*u*), as in FIG. 7. At this point, it is to be seen that both inner while portion (44*a*-*u*) and shaft (46), which have been rotated a certain amount by such one-stroke lever operation, are now locked against rotation due to the braking effect of brake unit (28), which also locks the rotation transmission link means (32) against any movement. Thus, the two links (14) (16) are both locked to a raised level set by the one-stroke lever operation under the braking action of brake unit (28), whereupon the seat (S) is currently set and locked to a certain raised level from the slide rail device (2) or a floor of automobile (not shown).

If it is desired to further raise the seat (S) from the thus-set first level, the user then has to rotate the lever (54) upwardly from the neutral position (N1) by one more stroke in the same manner as described above and releases it. Of course, he or she can repeat this upward rotation and downward releasing of lever (54) by plural strokes until the seat (S) is raised to a desired point of level.

On the other hand, to lower the seat (S) in the downward direction (D) as in FIGS. 1 and 2, the operation lever (54) should only be rotated downwardly as indicated by the arrow (DN) from the neutral non-use position (N1). In this instance, as understandable from FIG. 6, a user initially has to rotate the lever (54) downwards to cause clockwise rotation of the ratchet pawl member (48) in the arrow direction ② to thereby bring the second toothed ratchet pawl (48-d) to meshed engagement with the second ratchet gear wheel (44-d), whereupon a downward operative direction is selected in the drive mechanism (18). Then, by continuing on to rotate the lever (54) downwards, both second ratchet gear wheel (44-d) and shaft (28a) of brake unit (28) are caused to simultaneously rotate in the anti-clockwise direction of arrow (d), which in turn causes simultaneous clockwise rotation of brake unit pinion gear (28a), whereupon, referring to FIG. 1 or 2, the sector gear (32a) meshed with that pinion gear (28a) is rotated in the rearward direction (B), thereby rotatively displacing the whole rotation transmission link means (32) (i.e. 32a, 32b and 32c as in FIG. 1; or 32a and 32c as in FIG. 2) in the rearward direction of the seat (S). Those rotative actions finally cause both forward and rearward links (14) (16) to move downwards to lower the seat (S) in the downward direction (D). Still further downward rotation of the lever (54) results in the projected stopper portion (48b) being contacted with the second edge (52b) of arcuate cut-out region (56), likewise as in the upward lever operation described previously. The lever (54) is then prevented against further downward rotation, indicating the completion of one stroke of its downward rotation to attain a certain lowered level of the seat (S). If the user finds it to be a desired lowered position of the seat (S), he or she may release the lever (56) to allow the lever itself to be returned to the neutral position (N1) under the biasing force of spring (50), which in turn allows the ratchet pawl member (48) to be returned to the neutral position (N2) under the biasing force of spring (50). (as the return spring (50) has been wound reversely as opposed to the foregoing upward rotation of lever (54) and resiliently contracted about the auxiliary columnar portion (48e) from another end (50a) thereof, as can be assumed from FIG. 8)

If it is desired to further lower the seat (S), the user then should rotate the lever (54) downwardly from the neutral position (N1) by one more stroke in the same manner as described above and releases it. Of course, he or she can repeat this upward rotation and downward releasing of lever (54) by plural strokes until the seat (S) is lowered to a desired lowered point.

From the descriptions above, it is appreciated that the seat lifter (1) or the ratchet-type drive mechanism (18) is much simplified in operation by only rotating the lever means (18C) vertically without any particular switch-over operation as found in the prior art, and that the seat lifter (1) per se is simplified in structure since the linkage (10) may be basically formed only by the two links (14) (16) and sector gear arrangement (at 32) without requiring other special transmission gear mechanism. The seat lifter (1) can therefore be assembled easily with a less amount of parts and fittings required.

Further, the ratchet-type drive mechanism (18) is provided as one unit since all the constituent elements are arranged collectively in one base unit (38, 40), which allows its easy installation or attachment to a seat. Still further, the rotation of each of the first and second ratchet gear wheels (44-u) (44-d) can be output via the shaft (46) to cause various motions of other movable elements associated with the seat, thereby rendering the drive mechanism (18) per se adaptable for versatile uses, such as a driving source of seating posture adjustment devices provided in the seat.

While having described the present invention thus far, it should be understood that the invention is not limited to the illustrated embodiment, but any other modifications, replacements and additions may be structurally applied thereto without departing from the scopes of the appended claims. For example, the ratchet-type drive mechanism (18) may be used in other seating posture control devices including a reclining device or a seat slide device. Instead of the illustrated bell-crank like rearward link (16), the forward link (14) may be formed in a bell-crank shape, and to such forward link (14), the rotation transmission link means (32) may be arranged.

What is claimed is:

1. A seat lifter for adjustment in height of a vehicle seat, comprising:

a linkage means for operative connection with the vehicle seat, said linkage means including a first link means and a second link means, each being to be pivotally connected with forward and rearward sides of the vehicle seat, respectively, such as to allow rotative vertical motion of the linkage means, wherein one of said first and second link means is formed with a bell crank portion in an integral manner;

a drive means operatively connected with said linkage means;

said linkage means including a rotation transmission link means operatively connected between said linkage and drive means such that an operative rotation force applied from the drive means is transformed into said rotative vertical motion of the linkage means;

a brake means for providing a braking action to the rotative vertical motion of said linkage means;

said rotation transmission link means including a sector gear means which is in a meshed engagement with said brake means; and said drive means comprising a ratchet-type lever mechanism which includes:

a support base means;

a ratchet gear wheel means having a bearing shaft as the center of rotation thereof, said bearing shaft being rotatably supported by said support base means and securely connected with said brake means;

said ratchet gear wheel means including at least a first ratchet gear wheel and a second ratchet gear wheel, wherein each of said first and second ratchet gear wheel has one-way clutch means built therein, with such an arrangement that said first ratchet gear wheel is to be locked to said bearing shaft in a normal direction for integral rotation therewith, while being allowed to rotate about said bearing shaft in a reverse direction, and that said second ratchet gear wheel is to be locked to said bearing shaft in said reverse direction, while being allowed to rotate about said bearing shaft in said normal direction; and a ratchet pawl means rotatably supported by said support base means, said ratchet pawl means including a pair of first and second toothed ratchet pawls which are disposed thereon in correspondence with the respective said first and second ratchet gear wheels and further spaced apart from each other by a central angle relative to said center of rotation associated with said bearing shaft of the ratchet gear wheel means; a lever means operatively connected with said ratchet pawl means;

wherein operation of said lever means causes selective rotation of said ratchet pawl means in a selected one of said normal and reverse directions from a neutral position where the ratchet pawl means is normally out of meshed engagement with said ratchet gear wheel means, so that a selected one of said first and second toothed ratchet pawls is rotated in said selected one of the normal and reverse directions and brought to meshed engagement with a mating one of said first and second ratchet gear wheels; and a biasing means for normally biasing said ratchet pawl means in a direction to said neutral position, thereby normally placing both said first and second toothed ratchet pawls in a point out of engagement with said first and second ratchet gear wheels.

2. The seat lifter as defined in claim 1, wherein said first and second ratchet gear wheels each comprises an inner wheel portion and an outer gear wheel portion operatively engaged on and about said inner wheel portion via said one-way clutch means, and where said inner wheel portion is fixed on said bearing shaft.

3. The seat lifter as defined in claim 1, wherein said rotation transmission link means further includes a connecting link means having one end pivotally connected with said sector gear means and another end pivotally connected with said bell crank portion formed with said one of said first and second link means.

4. The seat lifter as defined in claim 1, wherein said rotation transmission link means is defined integrally in one of said first and second link means such that said sector gear means is integrally formed with said bell crank portion.

5. The seat lifter as defined in claim 1, wherein said ratchet pawl means comprises a ratchet pawl member having a main columnar body, an auxiliary columnar portion and a shaft, such that both said main and auxiliary columnar portions are coaxially formed on said shaft in an integral manner, said shaft being a center of rotation of said ratchet pawl member and rotatably supported by said support base means, wherein said first and second toothed ratchet pawls are so integrally formed on a circumferential side wall of said main columnar body as to be spaced apart from each other by a central angle relative to said shaft, wherein said biasing means comprises a circular return spring having two end portions, which is attached about said auxiliary columnar portion, wherein said auxiliary columnar portion is formed with a recession in which said two end portions of the circular return spring is resiliently retained, while a return spring retaining means is provided for retaining said two end portions of the circular return spring against rotation about said auxiliary columnar portion, so that said first and second toothed ratchet pawls are normally biased in the direction to said neutral position and kept out of engagement with the respective said first and second ratchet gear wheels.

6. The seat lifter according to claim 5, wherein a rotation restricting means is provided between said support base means and said main columnar body in a diametrically opposed relation with said recession formed in said auxiliary columnar portion, so that said ratchet pawl member is limited as to its extreme rotation caused by operation of said lever means.

7. The seat lifter according to claim 6, wherein said rotation restricting means comprises a projected stopper portion formed integrally with said main columnar body and an arcuate cut-out region defined in said base means, with such an arrangement that said projected stopper portion is normally positioned at a central point within said arcuate cut-out region under a biasing force of said circular return spring.

8. The seat lifter as defined in claim 1, wherein said brake means has a pinion gear, and wherein said rotation transmission link means further comprises an arcuate guide portion which is formed circumferentially of said sector gear such that said pinion gear is partly in mesh with said sector gear means and partly slidably contacted with said arcuate guide portion.

9. A ratchet-type lever mechanism for adjustment in position of a vehicle seat, comprising:

a support base means;

a ratchet gear wheel means having a bearing shaft as the center of rotation thereof, said bearing shaft being rotatably supported by said support base means and securely connected with a brake means operatively connected with said bearing shaft of the ratchet gear wheel means, said brake means being adapted for providing a braking action to said ratchet gear wheel means;

said brake means having a connection portion;

said ratchet gear wheel means including at least a first ratchet gear wheel and a second ratchet gear wheel, wherein each of said first and second ratchet gear wheel has one-way clutch means built therein, with such an arrangement that said first ratchet gear wheel is to be locked to said shaft in a normal direction for integral rotation therewith, while being allowed to rotate about said shaft in a reverse direction, and that said second ratchet gear wheel is to be locked to said shaft in said reverse direction, while being allowed to rotate about said shaft in said normal direction; and a ratchet pawl means rotatably supported by said support base means, said ratchet pawl means including a pair of first and second toothed ratchet pawls which are disposed thereon in correspondence with the respective said first and second ratchet gear wheels and further spaced apart from each other by a central angle relative to said center of rotation associated with said shaft of the ratchet gear wheel means;

a lever means operatively connected with said ratchet pawl means;

wherein operation of said lever means causes selective rotation of said ratchet pawl means in a selected one of said normal and reverse directions from a neutral position where the ratchet pawl means is normally out of meshed engagement with said ratchet gear wheel means, so that a selected one of said first and second toothed ratchet pawls is rotated in said selected one of the normal and reverse directions and brought to meshed engagement with a mating one of said first and second ratchet gear wheels; and a biasing means for normally biasing said ratchet pawl means in a direction to said neutral position, thereby normally placing both said first and second toothed ratchet pawls in a point out of engagement with said first and second ratchet wheels.

10. The ratchet-type lever mechanism for adjustment in position of a vehicle seat according to claim 9, wherein said connection portion of said brake means is connectable with a device for adjustment in position of the vehicle seat.

* * * * *